(12) United States Patent
Pauly

(10) Patent No.: US 6,581,877 B2
(45) Date of Patent: Jun. 24, 2003

(54) AIRCRAFT WITH VENTRAL FAIRING AND SEAL FOR SUCH AN AIRCRAFT

(75) Inventor: Bernard Pauly, Blagnac (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/158,008

(22) Filed: May 31, 2002

(65) Prior Publication Data

US 2003/0006344 A1 Jan. 9, 2003

(30) Foreign Application Priority Data

Jul. 6, 2001 (FR) .............................. 01 08982

(51) Int. Cl.[7] .................................................. B64C 1/00
(52) U.S. Cl. .................... 244/131; 244/117 R; 244/119
(58) Field of Search ........................ 244/119, 117 R, 244/120, 131, 123, 124

(56) References Cited

U.S. PATENT DOCUMENTS

| 2,360,220 A | * | 10/1944 | Goldman |
| 2,616,509 A | * | 11/1952 | Thomas |
| 2,981,504 A | * | 4/1961 | Parker |
| 3,023,860 A | * | 3/1962 | Ellzey |
| 3,499,622 A | * | 3/1970 | Lugan et al. |
| 3,935,664 A | * | 2/1976 | Neuhierl |
| 4,034,939 A | | 7/1977 | Ridley, Jr. et al. |
| 4,417,708 A | * | 11/1983 | Negri |
| 5,542,626 A | * | 8/1996 | Beuck et al. |

FOREIGN PATENT DOCUMENTS

| DE | 694021 | | 6/1940 | |
| DE | 943093 | * | 5/1956 | .................. 244/131 |
| DE | 3538483 | * | 4/1987 | .................. 244/131 |
| FR | 2789144 | | 8/2000 | |

OTHER PUBLICATIONS

Search Report dated Mar. 6, 2002.

* cited by examiner

*Primary Examiner*—Tien Dinh
(74) *Attorney, Agent, or Firm*—Stevens, Davis, Miller & Mosher, LLP

(57) ABSTRACT

According to the invention, fitted into the slot (20) between the suction face side (32) of a wing (6) and said ventral fairing (10) is a seal (22), the internal face (26) of the free end (28) of the lip (24) of which comprises at least one boss (30) able to keep said lip locally away from said suction face side (32) to form a controlled leakage of air passing through said slot (20).

7 Claims, 3 Drawing Sheets

AIRCRAFT WITH VENTRAL FAIRING AND SEAL FOR SUCH AN AIRCRAFT

BACKGROUND OF THE INVENTION

The present invention relates to an aircraft with a ventral fairing and to a seal for such an aircraft.

It is known that certain aircraft, provided with a fuselage and with a fixed wing structure comprising two wings which are opposed with respect to said fuselage, comprise a ventral fairing, generally projecting, in the form of a cradle, which is fixed to the underside of said fuselage where the latter meets said wing structure so as to close off the landing gear compartment, while possibly at the same time increasing the downward volume, and which has two longitudinal upstands reaching up the sides of said fuselage, said upstands each being provided with an opening for the passage of the corresponding wing. Such a fairing completes the aerodynamic profile of the intersection region and its shape is designed to minimize the aerodynamic drag that it generates.

DESCRIPTION OF THE PRIOR ART

In certain known aircraft, the method of attachment of this ventral fairing to the fuselage entails forming a peripheral slot around each wing, between the wing and the periphery of the corresponding opening of said fairing. In order to plug said slot, a seal is then provided which is fixed to the periphery of each opening and which comprises an elastic lip able, via the internal face of its free end, to press against the corresponding wing.

Now, in flight, because of the pressure difference between the pressure face side (at a raised pressure) and the suction face side (at a depression) of a wing, air begins to circulate within the fairing, through said slot, between the pressure face side and the suction face side of each wing and this, particularly on the suction face side, causes the free end of the elastic lip of said seal to detach from the corresponding wing. This gives rise to several drawbacks.

First of all, the elastic lip of the seal starts to vibrate in a frequency range which is perfectly audible from inside the cabin, and this proves annoying to the passengers. These vibrations are transmitted to the fuselage and to the elements it comprises (floor, support, etc.) and introduces structural fatigue loadings into said elements. In addition, the vibrations associated with the aerodynamic forces applied to said lip lead to premature fatigue thereof, which results in rapid wear which may go so far as to tear said lip. Finally, these vibrations cause parasitic aerodynamic drag to appear.

The object of the present invention is to overcome these drawbacks.

SUMMARY OF THE INVENTION

To this end, according to the invention, an aircraft comprising:
- a fuselage and a fixed wing structure comprising two wings which are opposed with respect to said fuselage;
- a ventral fairing in the form of a cradle, fixed to the underside of said fuselage, where the latter meets said wing structure, and provided with two longitudinal upstands reaching up the sides of said fuselage, said longitudinal upstands each being provided with an opening for the passage, with clearance, of the corresponding wing so that a peripheral slot is formed around each wing, between the wing and the periphery of the corresponding opening; and
- a seal fixed to the periphery of each opening to plug said slot and comprising an elastic lip able, via the internal face of its free end, to press against the corresponding wing, is notable in that, facing at least part of the suction face side of each wing, said internal face of the free end of said lip comprises at least one abutment boss able to keep said lip locally away from said suction face side so as to form a controlled leakage of air passing through said slot.

Thus, by virtue of the present invention, a controlled air leak is generated which eliminates, or at the very least greatly reduces, the vibration of said lip.

Depending on the geometry of the fuselage, of the wing structure and of the ventral fairing of the aircraft, the coefficient of pressure on certain parts of the suction face sides of the wings may be highly negative, which represents a great deal of suction, which means that the vibrations of the free end of the elastic lip may, at these points, have a great amplitude. It is therefore advantageous to apply the seal according to the present invention at least facing said parts of the suction face side at which the value of the coefficient of pressure is highly negative.

Of course, the height of each boss and the number of said bosses, and also their distribution, are determined, by calculation or by experiment, so that the flow rate of the air leak resulting from the presence of the boss or bosses generates very little parasitic drag, while at the same time ensuring that the lip of seal vibrates very little.

It will be noted that, in an aircraft, sealing is a constant concern to aircraft manufacturers because poor sealing may be the source of aerodynamic drag or of degradation to materials, through oxidation for example. For these reasons, the person skilled in the art is always seeking to obtain the best possible sealing of any space where there is a risk of leaks, and to do so in particular using devices specific to the geometry of the space that is to be filled (silicone sealant, very stiff seals, seals whose precise shape is tailored to the space that is to be filled, etc.). Thus, the present invention deviates from the prior art and organizes an air leak of controlled flow rate in order to solve a lack of sealing.

The present invention also relates to a seal for an aircraft comprising:
- a fuselage and a fixed wing structure comprising two wings which are opposed with respect to said fuselage;
- a ventral fairing in the form of a cradle, fixed to the underside of said fuselage, where the latter meets said wing structure, and provided with two longitudinal upstands reaching up the sides of said fuselage, said longitudinal upstands each being provided with an opening for the passage, with clearance, of the corresponding wing so that a peripheral slot is formed around each wing, between the wing and the periphery of the corresponding opening, said seal being fixed to the periphery of said openings to plug said slot and comprising an elastic lip able, via the internal face of its free end, to press against the corresponding wing and being notable in that facing at least part of the suction face side of each wing, said internal face of the free end of said lip comprises at least one abutment boss able to keep said lip locally away from said suction face side so as to form a controlled leakage of air passing through said slot.

In the known way, said seal may comprise on its internal face, between the free end of said lip and the end of the seal that is intended to be fixed to the fairing, an additional sealing member able to press against the corresponding wing. Of course, just as has been stated hereinabove in respect of said lip, said additional sealing member may, in flight, be made to detach from the corresponding wing under the action of the circulation of air between the pressure face side and the suction face side, through said peripheral slot. Here again, by virtue of the presence of the bosses on the internal face of the free end of the elastic lip, the air leaks passing through said slot can be controlled.

Advantageously, said additional sealing member may be in the form of a radially elastic longitudinal tube. Thus, when the seal is applied to the wing structure of the aircraft, the tube, in coming to bear against a wing, deforms and flattens, offering a broad bearing area.

Said seal may additionally comprise a longitudinal recess in the form of a strip, provided on its external face, at the side of the end of the seal that is intended to be fixed to the fairing, and able to act as a housing for the periphery of the corresponding opening in the fairing. Thus, said seal can provide aerodynamic continuity between the fairing and the wing.

Said seal is advantageously produced in the form of a monolithic section piece, for example made of elastomeric material, possibly fibre-reinforced.

BRIEF DESCRIPTION OF THE DRAWINGS

The figures of the appended drawing will make it easy to understand how the invention may be achieved. In these figures, identical references denote similar elements.

DESCRIPTION OF THE PREFERRED EMBODIMENT

Figure 1:
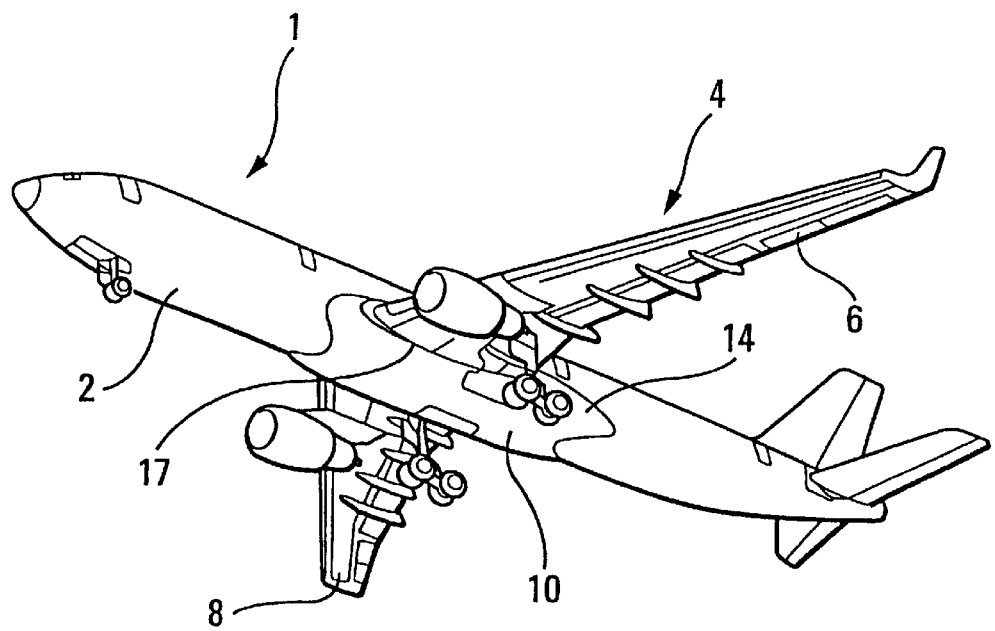
FIG. 1 is a schematic perspective view from below of an aircraft provided with a ventral fairing.
Figure 2:
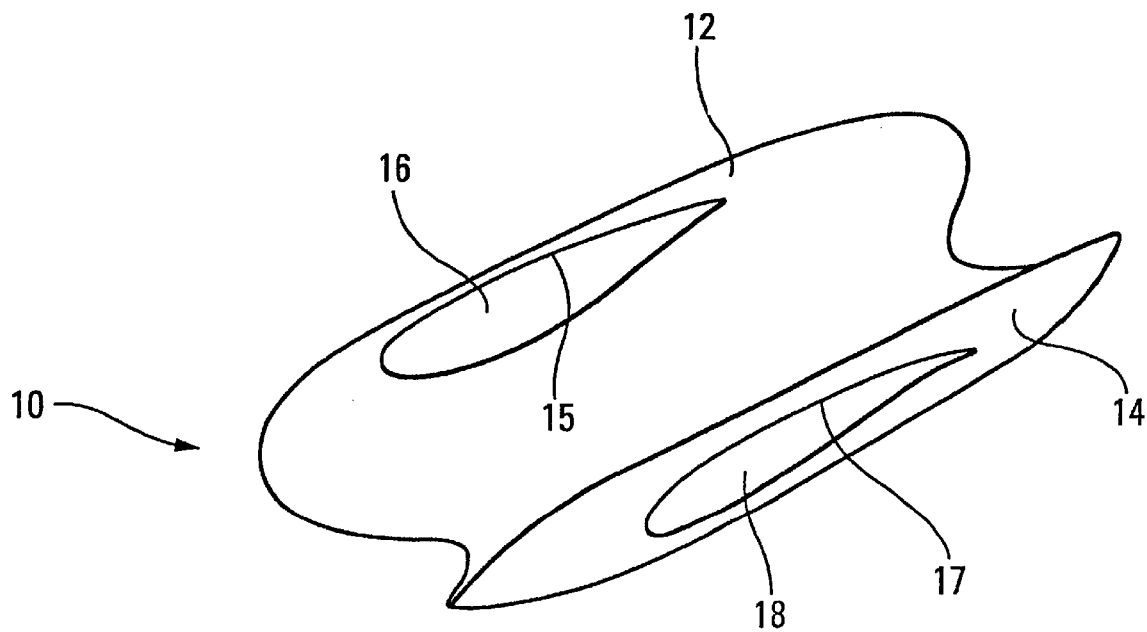
FIG. 2 is a schematic perspective view from above of said ventral fairing, separated from said aircraft and relieved of the internals of which it is composed.

The aircraft 1 depicted schematically in FIG. 1 comprises, in the known way, a fuselage 2, a fixed wing structure 4 comprising two wings 6 and 8 which are opposed with respect to the said fuselage 2, and a ventral fairing 10 in the form of a cradle which is fixed to the underside of said fuselage 2, where the latter meets said wing structure 4, and which protrudes with respect to the belly of said aircraft. Such a cradle has two longitudinal upstands 12 and 14 running laterally along said fuselage 2 (see also FIG. 2), said upstands 12 and 14 each being provided with an opening 16 or 18 for the passage of the corresponding wing 6 or 8.

Figure 3:
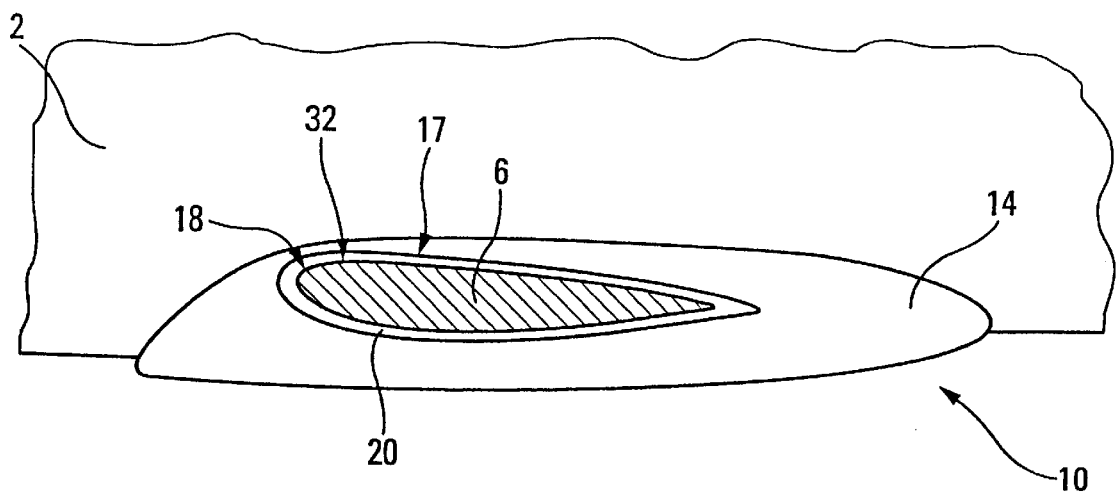
FIG. 3 is a schematic side view, on a larger scale, of the ventral fairing mounted on the aircraft and through which a wing passes, prior to the fitting of the seal according to the present invention.

Once the ventral fairing 10 has been fixed to the fuselage 2, there is a peripheral slot 20 around each wing 6 and 8 between this wing and the periphery 15 or 17 of the corresponding opening 16 or 18, as depicted in FIG. 3.

To plug said slot 20, there is provided a seal 22, intended to be fixed to the periphery 15 and 17 of each opening 16 and 18. Such a seal 22, which is in the form of a monolithic section piece, for example made of a reinforced elastomer, comprises an elastic lip 24 able to press, via the internal face 26 of its free end 28, against the corresponding wing 6 or 8 (see FIG. 4).

According to the invention, the internal face 26 of said lip 24 comprises spaced-apart abutment bosses 30, intended to be positioned facing at least part of the suction face side 32 of each wing 6 and 8. Such bosses 30 keep said end 28 of the lip 24 locally separated from said suction face side 32 so as to form spaces 31 organizing a controlled leakage of air passing through said slot 20 (see FIGS. 5 and 6).

In order to take account of the coefficient of pressure on the suction face side 32 of the wings 6, 8, the seal according to the invention is particularly pressed facing the parts of said suction face side 32 where the value of said coefficient is highly negative.

The height of the stop bosses 30, their number and their distribution along the free end 28 are determined so that the flow rate of the air leak through the spaces 31 generates little parasitic drag, while at the same time ensuring that the lip 24 vibrates very little.

The seal 22 according to the invention may additionally comprise an additional sealing member 34, situated on the internal face 35 of said seal 22, between the free end 28 of the elastic lip 24 and the end 36 of the seal which is intended to be fixed to the ventral fairing 10.

Figure 4:
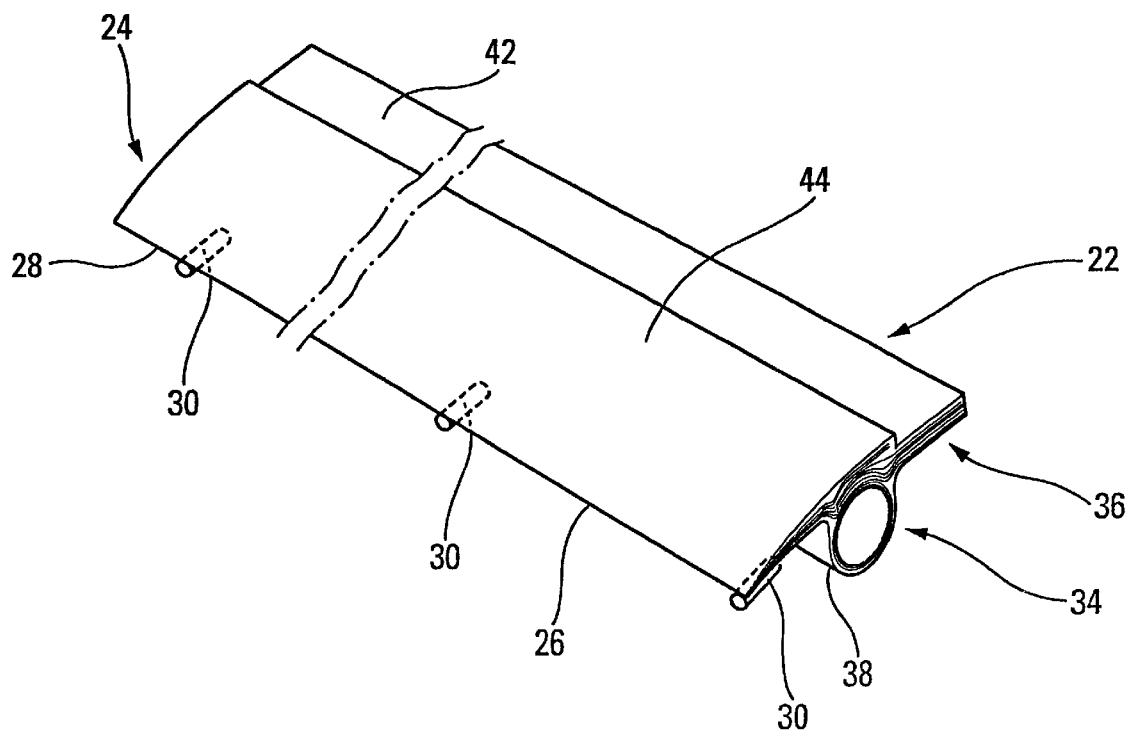
FIG. 4 depicts, in perspective from above, a seal according to the invention, not yet fixed to the ventral fairing.
Figure 5:
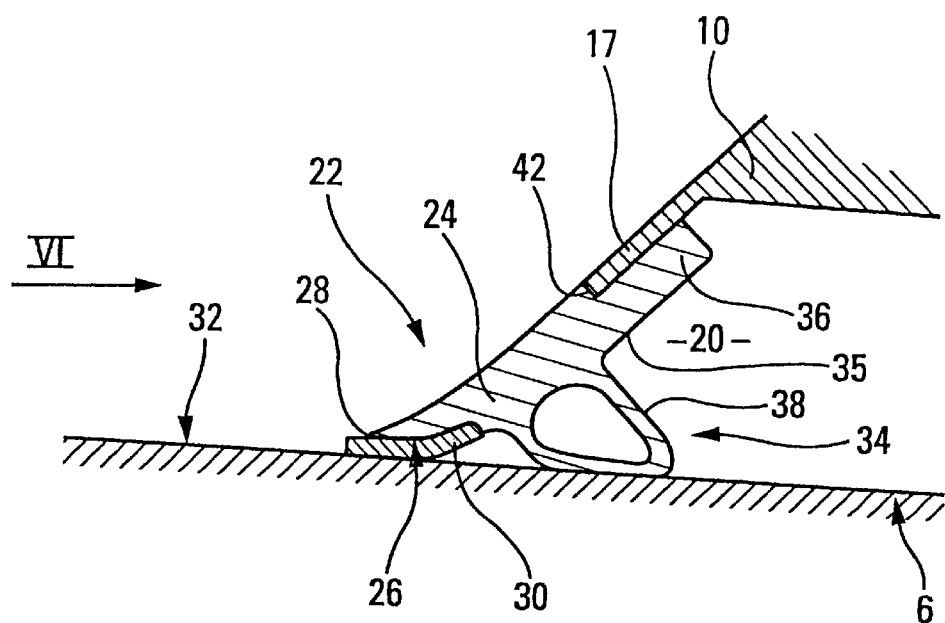
FIG. 5 depicts, in enlarged cross section, the seal according to the invention, installed on a ventral fairing to plug the slot between this fairing and the corresponding wing.
Figure 6:
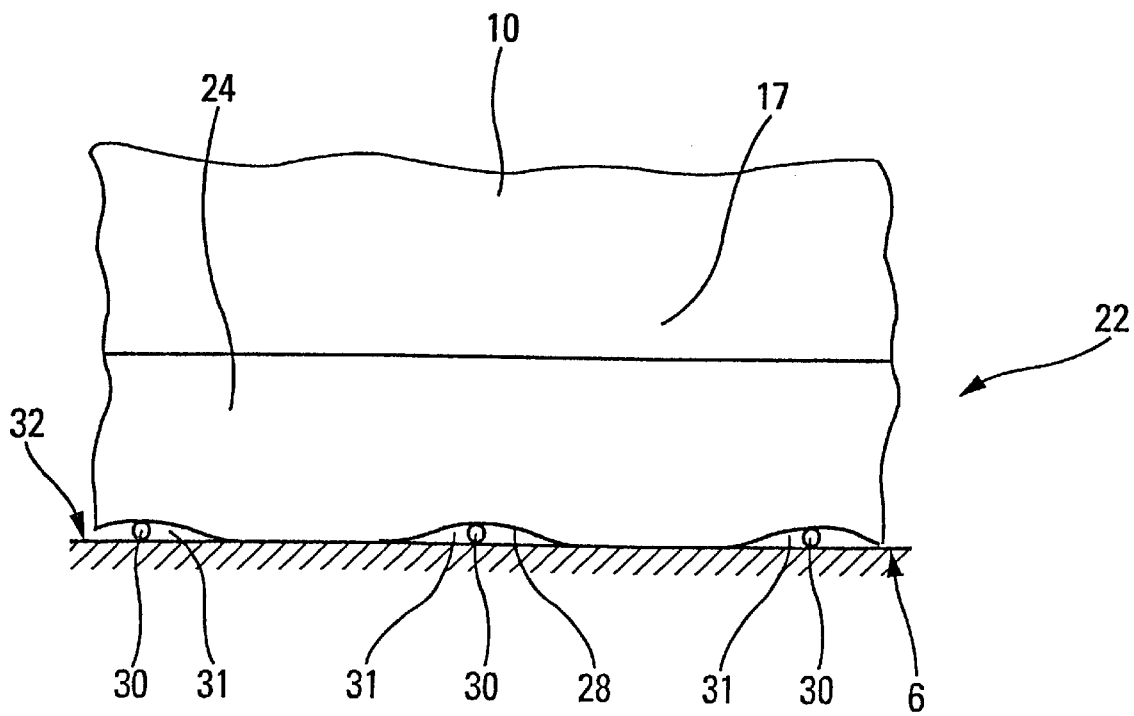
FIG. 6 corresponds to a front view on arrow VI of FIG. 5.

In the embodiment depicted in FIGS. 4 and 5, the additional sealing member 34 is in the form of a radially elastic longitudinal tube 38. Thus, when the seal 22 is pressed against the wings 6 and 8 of the aircraft 1, the tube 38, coming to bear against said wings, deforms and flattens, offering a broad bearing area as depicted in FIG. 5.

The seal 22 comprises a peripheral longitudinal recess in the form of a strip 42, situated on the external face 44 thereof, at the side of the end 36 of the seal 22 intended to be fixed to the fairing 10 and which is able to house the peripheral edge 15 or 17 of the opening 16 or 18 to which said seal is fixed, thus ensuring aerodynamic continuity between the fairing 10 and said wings 6 and 8.

When the pressure of the air flowing between the pressure face side and the suction face side of the wings 6 and 8 through the slot 20 reaches and exceeds a threshold value, the tube 38 detaches from the suction face side 32 and air passes between the latter and said tube 38. The resulting leakage is determined and controlled by the spaces 31, formed by said bosses 30, between the free end 28 of the lip 24 and said suction face side 32.

What is claimed is:

1. An aircraft comprising:

a fuselage and a fixed wing structure comprising two wings which are opposed with respect to said fuselage;

a ventral fairing in the form of a cradle, fixed to the underside of said fuselage, where said fuselage meets said wing structure, and provided with two longitudinal upstands reaching up the sides of said fuselage, said longitudinal upstands each being provided with an opening for the passage, with clearance, of the corresponding wing so that a peripheral slot is formed around each wing, between the wing and the periphery of the corresponding opening; and a seal fixed to the periphery of each opening to plug said slot and comprising an elastic lip having a free end operable, via the internal face of said free end, to press against the corresponding wing, wherein, facing at least part of a suction face side of each wing, said internal face of the free end of said lip comprises at least one abutment boss able to keep said lip locally away from said suction face side so as to form a controlled leakage of air passing through said slot.

2. The aircraft as claimed in claim 1, wherein said seal is applied at least facing those parts of the suction face side at which a value of a coefficient of pressure is highly negative.

3. A seal for an aircraft comprising a fuselage and a fixed wing structure comprising two wings which are opposed with respect to said fuselage, and a ventral fairing in the form of a cradle, fixed to the underside of said fuselage, where said fuselage meets said wing structure, and provided with two longitudinal upstands reaching up the sides of said fuselage, said longitudinal upstands each being provided with an opening for the passage, with clearance, of the corresponding wing so that a peripheral slot is formed around each wing, between the wing and the periphery of the corresponding opening, said seal for being fixed to the periphery of each opening to plug said slot and comprising an elastic lip having a free end operable, via the internal face of said free end, to press against the corresponding wing, wherein, facing at least part of a suction face side of each wing, said internal face of the free end of said lip comprises at least one abutment boss operable to keep said lip locally away from said suction face side so as to form a controlled leakage of air passing through said slot.

4. The seal as claimed in claim 3, and which comprises, on an internal face, between the free end of said lip and an end of the seal that is for being fixed to the ventral fairing, an additional sealing member operable to press against the wings.

5. The seal as claimed in claim 4,
wherein said additional sealing member is a radially elastic longitudinal tube.

6. The seal as claimed in claim 3, and which comprises a longitudinal recess in the form of a strip situated on the external face of said seal at the side of the end thereof that is operable to be fixed to the fairing, said recess for serving to house the peripheral edge of said opening.

7. The seal as claimed in claim 3,
and which is in the form of a monolithic section piece.

* * * * *